United States Patent [19]

Kunz

[11] Patent Number: 4,684,320

[45] Date of Patent: Aug. 4, 1987

[54] AXIAL FLOW COMPRESSOR CASE

[75] Inventor: Cleon V. Kunz, West Hartford, Conn.

[73] Assignee: United Technologies Corporation, Hartford, Conn.

[21] Appl. No.: 894,071

[22] Filed: Aug. 11, 1986

Related U.S. Application Data

[63] Continuation of Ser. No. 681,346, Dec. 13, 1984, abandoned.

[51] Int. Cl.⁴ .............................................. F04D 29/52
[52] U.S. Cl. ..................................... 415/190; 415/217; 415/219 R; 29/156.8 R; 29/526 R; 29/469; 403/337
[58] Field of Search ............... 415/115, 116, 189, 190, 415/191, 216, 217, 218, 219 R; 403/21, 22, 335, 337; 29/156.8 R, 526 R, 469

[56] References Cited

U.S. PATENT DOCUMENTS

| | | | |
|---|---|---|---|
| 2,519,326 | 8/1950 | Temple | 403/22 |
| 2,722,372 | 11/1955 | Ledwith et al. | 415/218 |
| 3,067,983 | 12/1962 | Koziura | 415/218 |
| 3,295,024 | 1/1967 | Woodwell et al. | 415/218 X |
| 3,319,930 | 5/1967 | Howald | 415/190 |
| 3,620,554 | 11/1971 | Ward et al. | 29/526 R X |
| 3,747,196 | 7/1973 | Whittington | 29/526 R X |
| 4,121,532 | 10/1978 | Coryell, III | 403/337 X |
| 4,491,755 | 1/1985 | Bertrand | 403/337 X |

Primary Examiner—Robert E. Garrett
Assistant Examiner—Joseph M. Pitko
Attorney, Agent, or Firm—Charles A. Warren

[57] ABSTRACT

The adjacent spacers that make up a compressor case for a multistage axial flow compressor carry a row of vanes at one end that are held in position during assembly of the compressor by a ring that is bolted to a flange at that end of the spacer and the spacer extends over the row of vanes of an adjacent spacer and is secured by a row of bolts to the adjacent spacer. This ring is T-shaped to pilot the ring on the spacer to which it is secured and also to pilot the opposite end flange of the adjacent spacer during assembly.

6 Claims, 3 Drawing Figures

AXIAL FLOW COMPRESSOR CASE

CROSS REFERENCE TO RELATED APPLICATIONS

This is a continuation of U.S. Ser. No. 681,346, now abandoned, filed Dec. 13, 1984 for AXIAL FLOW COMPRESSOR CASE filed by Cleon V. Kunz.

DESCRIPTION

1. Technical Field

This invention is concerned with the axial assembly of a multistage axial flow compressor case made up of rows of vanes and spacers between the rows of vanes that carry airseals for the intervening rows of blades on the rotor.

2. Background Art

In this form of compressor case assembly a row of vanes is assembled against one end of a spacer, the latter being wide enough to extend over a row of blades and also over the next adjacent row of vanes. The spacer serves to establish the desired axial spacing of adjacent row of vanes and also has a support for the vanes to hold them in position during assembly and when assembly is complete. In this arrangement the row of vanes is made up either of individual vanes or groups of two or more vanes having an outer shroud by which the vanes are supported in the case and the assembly of vanes and the surrounding spacer forms one of several assemblies to be put together by a relative axial movement as the rotor disks are similarly assembled with the disks alternating with the spaced rows of vanes.

This arrangement presents an assembly and disassembly problem because until the assembly is complete the vanes are not securely held in alignment on the spacer. Looseness or twisting of any vane or set of vanes in a row complicates either assembly and/or disassembly and frequently results in damage to the vanes or to the surrounding case structure. To overcome this objection each vane shroud has been individually secured to the supporting spacer so that the vanes are held in position during both assembly and disassembly. These individual attachments remain in the completed assembly without contributing to the integrity of the assembly, and their presence affects the secure attachment of the ring that would not be possible without these attaching elements. These elements are usually bolts located on substantially the same bolt circle as those bolts that hold adjacent casing rings or spacers together.

DISCLOSURE OF INVENTION

One feature of the present invention is to overcome the objection above-noted by the positioning of the outer shrouds of a row of vanes between a clamping ring that may be bolted to a flange on the spacer and that securely holds the shroud flanges between the clamping ring and the spacer flange. In this way, only a few bolts are necessary to hold the ring in relation to the spacer flange and thereby clamp all of the shroud flanges securely in position.

Another feature is the piloting of the adjacent spacer and its attached vanes by the particular shape of the clamping ring thereby providing for precise location of the adjacent spacers with respect to each other. Another feature is that the clamping ring is T-shaped and thus is piloted on one spacer flange and serves to pilot the adjacent spacer with the opposite flange. The T-shape also provides for holding the assembly bolts in position during the bolting of adjacent spacers together during the buildup of a compressor assembly.

According to the invention one spacer ring has a row of compressor vanes secured thereto by a ring that clamps the flanges on the outer shrouds of the vanes against a cooperating flange on the end of the spacer as the vanes are placed in position. This ring is secured by bolts circumferentially spaced around the ring. Only a few bolts are required for this purpose. This assemblage of vanes and spacer is then positioned against the next adjacent spacer and the attachment ring serves to pilot the end of the spacer remote from the vanes in position over the next row of vanes. By making the clamping ring T-shaped one flange extends over the flange against which the vane shrouds are clamped and thus the clamping ring is piloted on the spacer. The opposite flange on the T-shaped ring extends over the next adjacent spacer as it is placed in assembled position and pilots this spacer precisely into the desired location. This opposite flange also serves to engage a flat surface on each bolthead of the bolts that secure adjacent spacers together thereby holding the bolts against turning during assembly and/or disassembly.

The foregoing and other objects, features and advantages of the present invention will become more apparent from the following description of preferred embodiments and accompanying drawings.

BEST MODE FOR CARRYING OUT THE INVENTION

Figure 1:
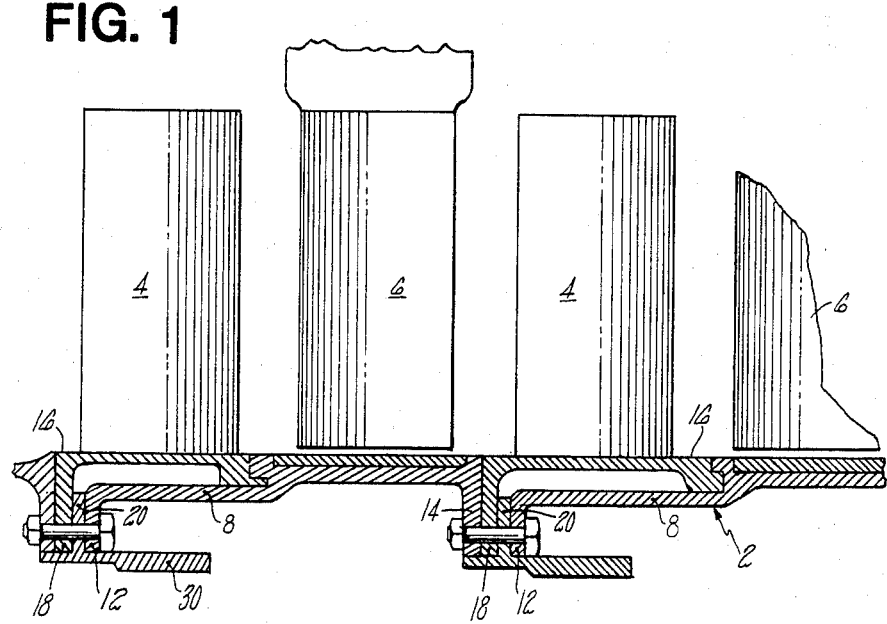
FIG. 1 is a longitudinal sectional view through the structure of the invention.
Figure 2:
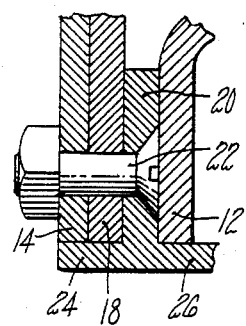
FIG. 2 is an enlarged detail of the fastening means for the T-shaped ring.
Figure 3:
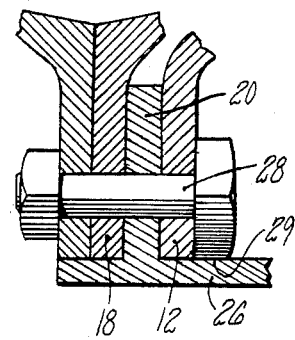
FIG. 3 is another sectional view similar to FIG. 2 taken at a different position circumferentially of the spacer.

The multistage axial flow compressor has a surrounding case 2 that supports rows of vanes 4 that alternates with rows of blades 6 on the rotor. The assembled rotor is not shown, and only two rows of blades and vanes are shown.

Each case is made up of spacers 8, in the form of rings, each spacer having attachment flanges 12 and 14 as opposite ends thereof. These flanges extend outwardly from the spacer. A row of vanes 4 is attached to each spacer at one end thereof. As shown, the vanes 4 have outer shrouds 16, any one of which may be individual to each vane or may extend over and be integral with two or more vanes depending upon the overall design of the device. Each shroud 16 has an outwardly extending mounting flange 18 which engages with the spacer flange 14 of the next adjacent spacer ring and is held against the flange 14 by a clamping ring 20 secured as by bolts 22 against the flange 14 and thereby clamping the flanges 18 therebetween. These bolts are preferably flatheaded and extend through the ring 20, the shroud flange 18 and the spacer flange 14. In this way the individual vanes may be assembled against the spacer flange and thus held in position by the ring 20 when it is bolted in place.

The ring 20 is T-shaped and has a lateral flange 24 at its outer end to overlie the vane shroud flanges 18 and the spacer flange 14, as shown, thereby to pilot the ring with respect to the spacer and to provide engagement with the outer surface of the flanges 18 for more securely holding the vanes in position.

It will be understood and apparent from the drawing that the vane shrouds extend axially away from the spacer to which they are attached and are so positioned that they fit within the adjacent spacer when assembly of the compressor case is completed and are supported within that adjacent spacer.

The assemblage of spacer, vanes and clamping ring is then placed in position in contact with the next adjacent spacer and with the vane shrouds within the next adjacent spacer by axial sliding movement of one assembly with respect to the other. Obviously, a disk carrying a row of blades 6 will have been positioned between adjacent rows of vanes prior to this assembly.

As the adjacent spacers are brought axially together, the flange 12 on the spacer remote from the row of vanes engages under a lateral flange 26 on the outer edge of the T-ring opposite to the flange 24. In this way adjacent spacers are piloted with respect to one another. Since the bolts 22 are flat headed they do not interfer with direct contact between the flange 12 and adjacent T-ring flange 20.

Also, as the adjacent spacers are assembled, a flange 27 on the edge of the vane shroud remote from the flange 18 engages in a notch 31 midway of the ends of the compressor such that the vane is retained securely in position after assembly.

The assemblage is then bolted together by a row of bolts 28 on the same bolt circle as the bolts 22 and the assemblage is then complete. The flange 26 engages one flat 29 on the head of each bolt 28 to hold it against turning in assembly or disassembly of the case.

Since the row of vanes are held securely on each spacer, assembly of the compressor case may be easily accomplished and later disassembly is done with the vanes remaining in proper relation on the associated spacer. With this construction it is possible to assemble or disassemble the whole compressor case without concern of the vanes becoming loose or out of position during either assembly or disassembly operations. The vanes will remain securely in position on the spacer until the spacer with the vanes thereon is completely removed from the assembly. Since the T-ring is a separate element, it is easily replaced or repaired in the event of damage during disassembly. It may be desirable to provide an extension 30 on one side of the T-ring to serve as a mounting for any structure required to be mounted on or attached to the case.

It should be understood that the invention is not limited to the particular embodiments shown and described herein, but that various changes and modifications may be made without departing from the spirit and scope of this novel concept as defined by the following claims.

I claim:

1. In the method of assembly of a compressor case in which the case includes at least two casing rings each having a flange at each end and each having a row of vanes secured thereto, said vanes having shrouds at their outer ends and the shrouds having a flange at one edge for engagement with and attachment to one of the flanges on the casing ring and a T-ring having a flange to overlie the outer edges of the contacting flanges in the shrouds and casing and a stem portion on the T-ring to engage axially against the flanges on the shrouds, the steps of positioning the flanges on the shrouds of a row of vanes against the outer face of one of the flanges in the casing rings such that the shrouds are substantially in alignment with the ring and extending axially therefrom to form an extention of said ring, positioning the T-ring with its stem portion against the flanges on the shrouds and using the flange on the T-ring to align the ring and shrouds by engagement with the periphery of said ring flange and shroud flanges, bolting the shroud flanges and casing ring and T-ring together as a subassembly for a compressor case, sliding the adjacent casing ring over the shrouds of the subassembly to place the the flange on the casing ring at the end of the adjacent ring remote from the shroud flange attachment flange against the opposite side of the stem portion of the T-ring engaging the shroud flanges, the shrouds having axial flanges on the edges remote from the bolting flanges and the adjacent casing ring having an axial slot therein to receive said flanges on the shrouds on the subassembly such that the axial flanges and axial slot are interengaging when the adjacent casing ring is assembled in position over the shrouds of the subassembly, and bolting the adjacent casing ring to the subassembly by bolts passing through the bolted flanges of the subassembly and the flange on the adjacent casing ring.

2. The method of claim 1 in which the method includes bolting the several flanges and ring of the subassembly together by a ring of bolts and bolting the adjacent casing ring to the subassembly by another row of bolts on substantially the same diameter and staggering the bolts in the two rings of bolts circumferentially.

3. The method of claim 1 in which the method includes utilizing bolts on the subassembly that will provide a flat surface on the stem portion of the T-ring engaged by the adjacent casing ring flange so that said stem portion of T-ring and said flange will be in contact.

4. A compressor case construction including a plurality of casing rings each having flanges at each end by which the rings may be secured together to form the compressor case a row of vanes supported by each ring, the vanes having outer shrouds by which the vanes are supported on the casing ring, each shroud having an outwardly extending flange at one edge engaging laterally with the flange at one end of the casing and with the shrouds extending axially beyond said casing ring to form an extention of said casing ring an attachment T-ring surrounding the row of vanes and having a stem portion positioned on the side of shroud flanges opposite the casing ring and secured to the flanges on the casing ring by bolts extending through said casing flange, shroud flanges and T-ring, said casing ring, shrouds and T-ring when bolted together forming a subassembly for a compressor case and each casing ring being of such a width as to space the adjacent rows of vanes apart and to overlie the shrouds on the row of vanes on an adjacent casing ring such that flange on said next adjacent casing ring remote from the flange to which the shroud flanges are attached engages with and is piloted by said T-ring, said adjacent casing ring being bolted to said T-ring and to the spacer ring to which the T-ring and shrouds are attached in the subassembly.

5. A compressor case construction as in claim 4 in which the T-ring has opposed lateral flanges at its outer end, one of said flanges extending over the adjacent spacer flange and shroud flanges to pilot the ring with respect to said spacer flange and said shroud flanges and the other flange on this T-ring extends axially to engage and pilot the end flange on the adjacent spacer in the assembly of the compressor case.

6. A compressor case as in claim 4 in which the bolts utilized for securing the subassembly together are so constructed that the exposed surface of the bolt on the side of the T-ring opposite to its contact with the shroud flanges will present a flat surface such that the flange on the adjacent spacer ring will engage said T-ring directly.

* * * * *